(12) United States Patent  (10) Patent No.: US 8,891,677 B2
Yue et al.  (45) Date of Patent: Nov. 18, 2014

(54) POWER SCALING FOR RETRANSMISSIONS IN UPLINK MIMO HYBRID ARQ

(75) Inventors: Guosen Yue, Plainsboro, NJ (US);
Narayan Prasad, Wyncote, PA (US);
Meilong Jiang, Plainsboro, NJ (US);
Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 374 days.

(21) Appl. No.: 13/292,659

(22) Filed: Nov. 9, 2011

(65) Prior Publication Data

US 2012/0114030 A1 May 10, 2012

Related U.S. Application Data

(63) Continuation-in-part of application No. 13/252,650, filed on Oct. 4, 2011, now Pat. No. 8,699,621.

(60) Provisional application No. 61/411,500, filed on Nov. 9, 2010.

(51) Int. Cl.
*H04L 27/00* (2006.01)
*H04L 25/03* (2006.01)
*H04L 5/00* (2006.01)
*H04W 52/48* (2009.01)
*H04L 1/18* (2006.01)
*H04L 1/00* (2006.01)

(52) U.S. Cl.
CPC ........ *H04L 5/0055* (2013.01); *H04L 25/03923* (2013.01); *H04W 52/48* (2013.01); *H04L 1/0009* (2013.01); *H04L 1/0003* (2013.01); *H04L 1/1819* (2013.01); *H04L 1/1867* (2013.01)

USPC .......... 375/299; 375/267; 375/296; 455/522; 714/748; 714/749

(58) Field of Classification Search
CPC .. H04W 52/48; H04W 52/146; H04L 1/1816; H04L 1/1819; H04L 1/1825
USPC .................. 375/260, 267, 296, 299; 455/522; 714/748–751
See application file for complete search history.

(56) References Cited

U.S. PATENT DOCUMENTS

2009/0252236 A1* 10/2009 Li et al. .......................... 375/260
2010/0048236 A1* 2/2010 Higuchi et al. ............... 455/522
2010/0131813 A1* 5/2010 Kim et al. ...................... 714/748

OTHER PUBLICATIONS

3GPP TSG RAN WG1 #62, R1-104850 "Precoding for PHICH-triggered retransmissions" Ericsson, ST-Ericsson; Madrid, Spain; Aug. 23-27, 2010, pp. 1-3.*

(Continued)

*Primary Examiner* — Sophia Vlahos
(74) *Attorney, Agent, or Firm* — Joseph Kolodka

(57) ABSTRACT

A method includes obtaining a precoder for retransmission of one codeword responsive to known precoding matrix P of rank r and modulation and coding scheme MCS assignments used in an original transmission, and a desired retransmission rank r'; and scaling power in the retransmission responsive to at least two of 1) information parameters Index of UL precoder in previous transmission, 2) rank r of uplink UL precoder in previous transmission, 3) MCS assignments in previous retransmission ($MCS_i$), 4) rank r' for UL retransmission 5) number of retransmit antennas used for codeword to be retransmitted x in previous transmission, 6) number of retransmit antennas x' used for retransmission, 7) precoder for UL retransmission, 8) UL precoders and channel information for previous transmission, and 8) latest channel measurements.

4 Claims, 3 Drawing Sheets

(56) References Cited

OTHER PUBLICATIONS

NEC, "Precoding selection for PHICH triggered retransmission in UL MIMO," in 3GPP TSG RAN WG1 R1-105418, Xi'an, China, Oct. 2010.
G. Berardinelli, T. B. Sorensen, P. E. Mogensen, and K. Pajukoski, "Precoded multirank transmission with linear receivers for LTE-A uplink," in Proc. IEEE Veh. Technol. Cont. (VTC), Anchorage, AK, Sep. 2009.
3GPP, Evolved Universal Terrestrial Radio Access (E-UTRA); Further advancements for (E-UTRA) physical layer aspects. TR36.814 V9.0.0, Mar. 2010.

* cited by examiner

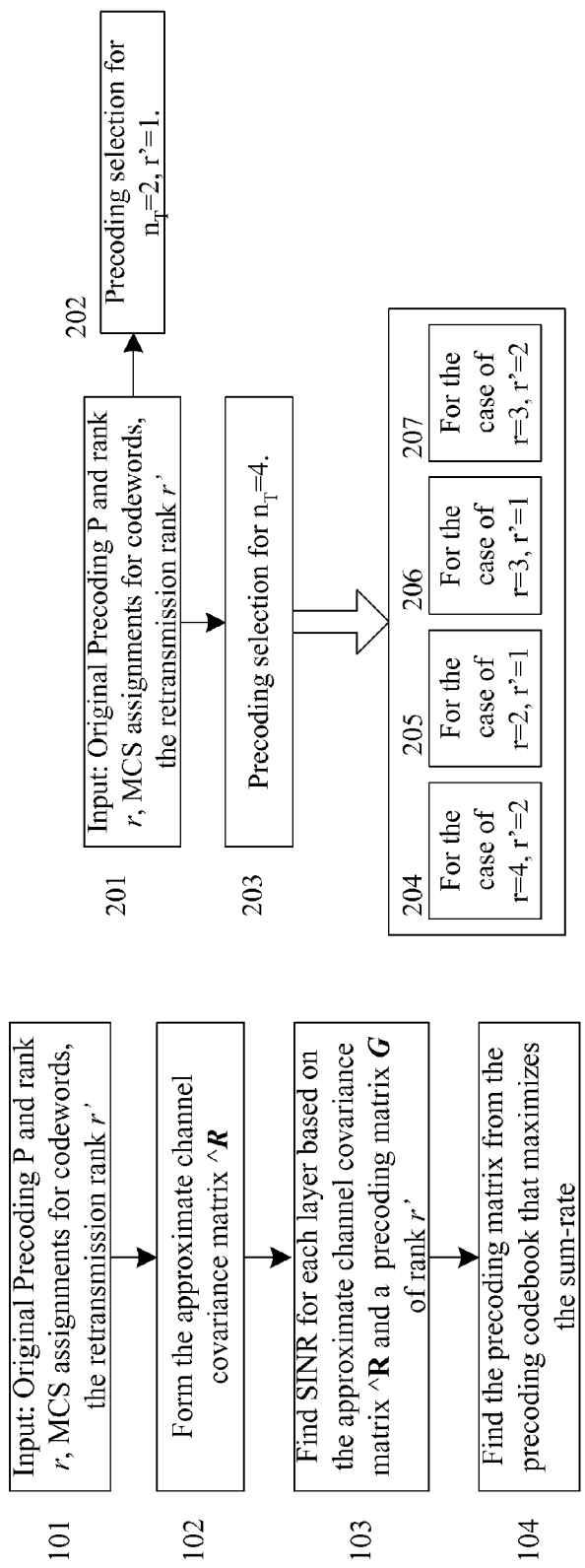

POWER SCALING FOR RETRANSMISSIONS IN UPLINK MIMO HYBRID ARQ

This application is a continuation-in-part if U.S. patent application Ser. No. 13/252,650, entitled "Precoding Selection for Retransmissions in Uplink MIMO Hybrid ARQ", filed Oct. 4, 2011, and claims the benefit of U.S. Provisional Application No. 61/411,500, entitled, "Power Scaling for Retransmissions in Uplink MIMO Hybrid ARQ", filed Oct. 9, 2010, the contents of which are incorporated herein by reference.

BACKGROUND OF THE INVENTION

The present invention relates generally to broadband and wireless communications and more particularly to power scaling for retransmissions in uplink MIMO Hybrid ARQ.

Uplink (UL) multiple-input multiple-output (MIMO) with linear precoding has been considered as one important feature for the enhancement of UL transmission in new LTE-Advanced (LTE-A) standard for the fourth generation (4G) cellular systems. The feasibility studies for UL precoding in single user MIMO have shown that an approximately 3 dB gain can be achieved by the precoding over the no precoding transmission for a codebook size of 16. After extensive discussions, the precoding codebook for the UL MIMO has been finalized in for up-to-four transmit antennas.

On the other hand, synchronous non-adaptive hybrid ARQ (HARQ) is still the basic principle for LTE-A UL transmissions, which is the same as that in the LTE systems. In the synchronous non-adaptive HARQ, the retransmission is scheduled in the fixed time instance and the fixed resource block with the same modulation and coding scheme (MCS) as that of the original transmission. The adaptive retransmission is only used as a complement to non-adaptive HARQ to avoid fragmenting the uplink frequency resource or to avoid collisions with random-access resources. The physical hybrid ARQ indicator channel (PHICH) carries the acknowledgement (ACK or NACK) and is transmitted from the base station to the user equipment (UE). Without additional information, the synchronous non-adaptive UL retransmission is operated by default. When adaptive retransmission is scheduled, the resource block and MCS information are delivered to the users through the physical downlink control channel (PDCCH) for the uplink retransmissions.

Since, in LTE systems, the uplink MIMO is not supported, only one codeword is transmitted for each time interval. Thus, the problem regarding the multi-codeword MIMO in hybrid ARQ as that for the DL the hybrid ARQ does not exist. However, this is not the case in LTE-A systems when the uplink MIMO is introduced. Therefore, non-adaptive UL retransmission triggered by PHICH in LTE should be extended to multi-codeword transmission in LTE-A UL. For multi-codeword transmission in uplink MIMO, when the number of codewords in the retransmissions is different from previous retransmissions, how to assign the precoding for the retransmissions is a problem. Here we assume that at most two codewords are allowed for transmission across multiple layers in UL MIMO. Based on the latest discussions in 3GPP meetings, when the number of codewords in the retransmissions is same as previous retransmissions, the rank and precoding vector stay the same, and the retransmission does not carry any automatic power adjustment command.

Several schemes have been proposed for the precoder selections for non-adaptive HARQ in UL MIMO: 1) User terminal selects whatever the precoder wants; the basestation can still decode since the demodulation reference signal (DMRS) is precoded; 2) Use of subset of columns of a precoding matrix with the one corresponding to larger Modulation and coding scheme (MCS); 3) Use of predefined precoding matrix (fixed or cycle) among a set of precoding matrix; 4) a single antenna transmission mode; 5) Using the same precoding matrix as that in the original transmission and occupying all layers; and 6) Precoding column compression with a merger of the columns.

However, none of the aforementioned techniques addresses the problem of precoding selections at the user terminal for retransmitting one or multiple codewords in non-adaptive hybrid ARQ for uplink (UL) MIMO when the transmission rank or number of codewords in the retransmissions is smaller than the corresponding value in the original transmission. Particularly, the problem framework considers that only imperfect channel state information (CSI), e.g., quantized channel information, is available at the user terminal. Accordingly, there is a need for precoding selection for retransmission in uplink hybrid ARQ that solves this problem Another consideration in retransmissions, in uplink MIMO Hybrid ARQ, is power scaling at the user terminal for retransmitting one or multiple codewords in non-adaptive hybrid ARQ (HARQ) for uplink (UL) MIMO when the transmission rank or number of codewords or transmission blocks (TB) in the retransmissions is less than the corresponding value in the original transmission. A scenario exists where the precoder for the retransmission has been specified or fixed.

Accordingly, there is a need for a general power scaling and resource allocation rule for the adaptive hybrid ARQ in which the retransmission precoder is decided by base station then informed to the user terminal.

BRIEF SUMMARY OF THE INVENTION

The invention is directed to a method that includes obtaining a precoder for retransmission of one codeword responsive to known precoding matrix P of rank r and modulation and coding scheme MCS assignments used in an original transmission, and a desired retransmission rank r'; and scaling power in the retransmission responsive to at least two of 1) information parameters Index of UL precoder in previous transmission, 2) rank r of uplink UL precoder in previous transmission, 3) MCS assignments in previous retransmission (MCS$_i$), 4) rank r' for UL retransmission 5) number of retransmit antennas used for codeword to be retransmitted x in previous transmission, 6) number of retransmit antennas x' used for retransmission, 7) precoder for UL retransmission, 8) UL precoders and channel information for previous transmission, and 8) latest channel measurements. In an aspect of the inventive method, responsive to the index and rank r of the UL precoder, MCS assignments in the previous retransmission (MCS$_i$), and the rank r' for UL retransmission, the parameter β for power scaling in the retransmission is determined and a retransmission power in each antenna is scaled with a factor θ=βr'/r.

These and other advantages of the invention will be apparent to those of ordinary skill in the art by reference to the following detailed description and the accompanying drawings.

BRIEF DESCRIPTION OF THE DRAWINGS

FIG. 1 is a block diagram of precoding selection in non-adaptive hybrid automatic repeat request HARQ in uplink UL MIMO, in accordance with the invention;

FIG. 2 is a block diagram of the inventive precoding selection for Physical Hybrid ARQ Indicator channel PHICH triggered non-adaptive HARQ in UL MIMO, in accordance with the invention;

FIG. 3 is a table of precoding matrices for PHICH triggered retransmission in UL MIMO.

DETAILED DESCRIPTION

Figure 4A:
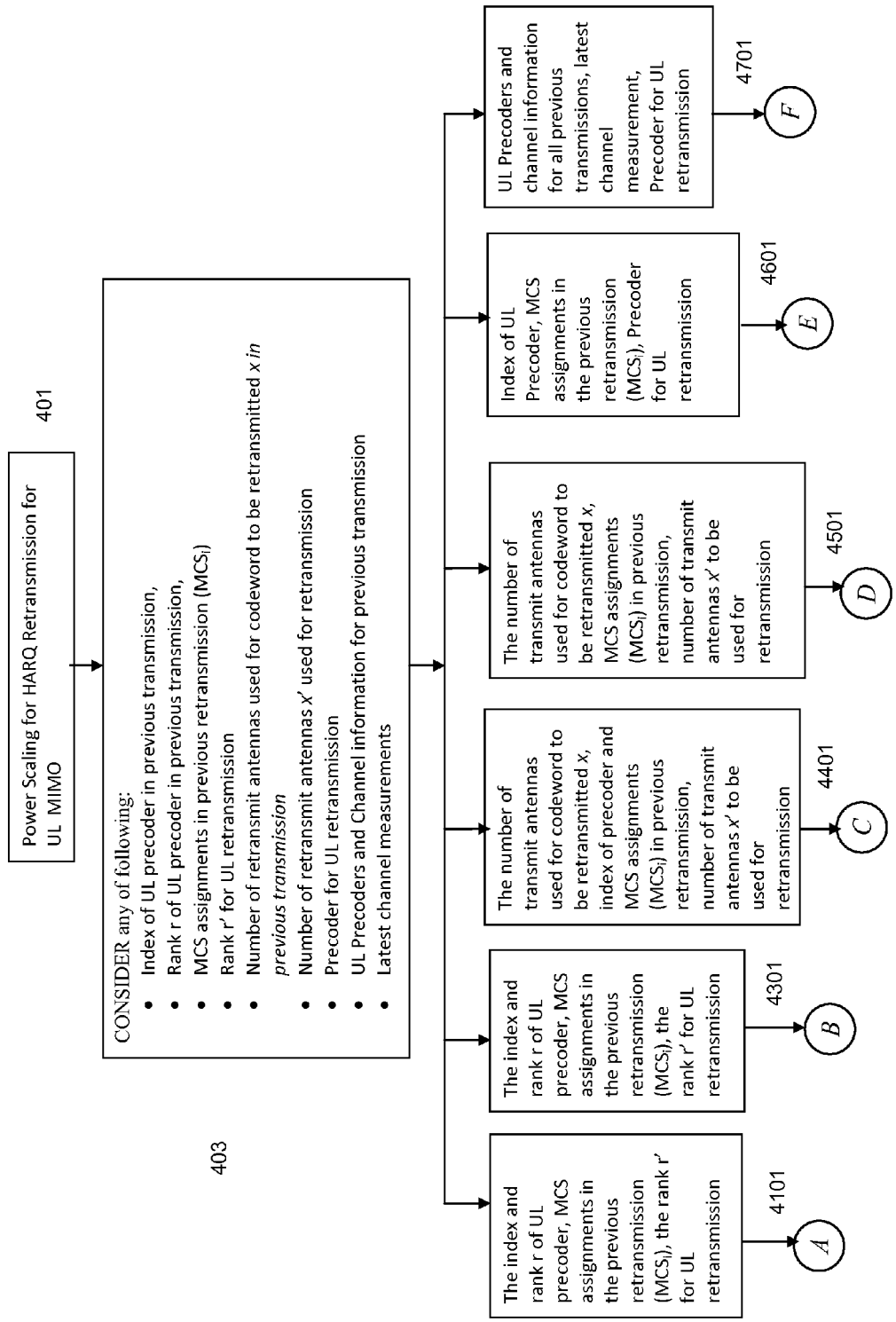
FIGS. 4A and 4B together depict a block diagram detailing power scaling for HARQ retransmission for UL MIMO, in accordance with the invention.

The present invention is directed to method for power scaling as a function of the original precoder and MCS assignment to avoid inefficient power scaling when the specified retransmission precoder does not align with the channel direction in non-adaptive hybrid ARQ. The invention also simplifies the power scaling rule which only depends on MCS assignments in the previous transmission. The inventive method provides for power scaling and resource allocation for UL retransmissions in the adaptive HARQ, in which the UL precoder and the resource block are determined by the base station and informed to the user terminal via a downlink control channel.

The block diagram of FIG. 1 shows the inventive precoding selection for non-adaptive HARQ retransmission for UL MIMO with imperfect/partial channel information. Initially, 101, the user terminal knows the precoding matrix P of rank r and the MCS assignments used in original transmission, as well as the desired retransmission rank r'. Based on these inputs we obtain the precoder for the retransmission of one codeword.

Following the input step 101, the method 102 forms an approximate channel covariance matrix $\hat{R}$, given by $R \triangleq H^\dagger H \approx PDP^\dagger \triangleq \hat{R}$, where $D=\text{diag}\{\lambda_1, \ldots, \lambda_r\}$, and complex matrix H is the UL uplink channel. To obtain $\{\lambda_j\}$, we use the MCS information of each codeword assigned by base station. The MCS to a codeword is assigned based on the estimated effective SINR at eNodeB for the whole codeword, i.e., the largest MCS level that can achieve a block error rate (BLER) smaller than 10% for a given effective SINR. Thus, according to the empirical BLER curves of turbo coded modulation for all MCS levels in the standard, given the MCS assignments in the original transmission, we can find the signal-to-noise ratio (SNR) threshold at 10% BLER for such MCSs and use them as the $\{\lambda_j\}$ for all the layers mapped to this codeword. For example, the SNR thresholds for the MCS level 8 (QPSK, code rate Rc=0.5137) and level 16 (16QAM, Rc=0.6016) are 1.2676 dB and 8.1354 dB, respectively. If these two MCS levels are assigned to a rank-2 precoding, we then obtain the corresponding absolute values of $\{\lambda_j\}$ given by 1.3389 and 6.5094, respectively. From the layer-codeword mapping rules, we then have $D=\text{diag}\{1.3389, 6.5094\}$ for r=2 and $D=\text{diag}\{1.3389, 1.3389, 6.5094, 6.5094\}$ for r=4.

After the preceding formation of the covariance matrix 102, for a precoding matrix G, 103, the method then estimates a minimum mean square error MMSE receiver SINR for each layer to be retransmitted, given by $$SINR_i'(G) = \frac{\Xi_{i,i}}{1-\Xi_{i,i}} \approx \frac{\alpha_i}{1-\alpha_i}$$

where $\alpha_i = [(I+G^\dagger \hat{R} G)^{-1} G^\dagger \hat{R} G]_{i,i}$, and $\Xi \approx (I+G^\dagger \hat{R} G)^{-1} G^\dagger \hat{R} G$.

Lastly, the precoding matrix G is found 104 from the precoding codebook that maximizes the sum-rate i.e.

$$G' = \arg\max_{G \in \mathcal{G}^{n_T \times r'}} \sum_{i=1}^{r'} \log_2(1 + SINR_i'(G)),$$

where $\mathcal{G}^{n_T \times r}$ is the complex matrix space of dimensions $n_T \times r$ and $SINR_i'(G)$ is the signal-to-interference-plus-noise ratio (SINR) for the ith layer at the receiver.

Specifically, for retransmission rank r'=1, we have $$g' = \arg\max_{g \in \mathcal{G}^{n_T \times r}} g^\dagger H^\dagger H g,$$

where $\mathcal{G}^{n_T \times r}$ is a finite set, and G' is obtained by searching from all elements in the set.

The block diagram of FIG. 2 shows the inventive precoding selection for PHICH triggered non-adaptive hybrid HARQ in UL MIMO.

Initially with the invention, 201, the user terminal knows the precoding matrix P of rank r in the agreed UL codebook in LTE-A and the MCS assignments used in original transmission, as well as the desired retransmission rank r'. Based on these inputs we obtain the precoder for the retransmission of one codeword.

Then under the inventive method, 202, with a precoding selection for $n_T=2$, r'=1 occurs, we obtain the receiver SINR for a given precoder according to the relationship $SINR'(g') = \lambda_1|g'_1|^2 + \lambda_2|g'_2|^2$ where the precoding vector for retransmitting one codeword is $g' = [g'_1, g'_2]^T$. From the layer-1 UL codebook in LTE-A for $n_T=2$ in Table 1, the first four vectors offer the same SINR, but the last two which utilize only one transmit antenna results in a smaller SINR. Therefore, the precoding vector for retransmission can be chosen as any one of the first four precoding vectors in Table 1 of the UL codebook, e.g. the first precoder (of index 0) in Table 1. Since the original precoding vector is an identity matrix which does not align to any channel matrix, for the retransmission with a lower rank r'<r, the better choice is cycling of the precoders among the first four precoding vectors in Table 1.

Then the method obtains the precoding selection for $n_T=4$ case by case 203.

For the case 204 of a precoding selection for $n_T=4$, r=4, r'=2: the method obtains the per layer SINR from linear MMSE receiver, given by $$SINR_i'(G') = \frac{\Xi_{i,i}'}{1-\Xi_{i,i}'},$$

where $\Xi^1 = (I+G^{1\dagger}DG^1)^{-1}G^{1\dagger}DG^1$.

The sum-rate can thus be obtained by $\sum_{i=1}^{r'} \log_2(1+SINR_i^1(G^1))$. Then, based on tables in the UL codebook in LTE-A, we obtain the following selection rule: For $n_T=4$, when the latest transmission is full rank, i.e., r=4, the precoding vector for a retransmission with rank r'=2 can be fixed to be any one of the eight precoding vectors of index 8 to 15 in the 2-layer procoding codebook in Table 3 of the UL codebook in LTE-A, or cycling in time of the eight precoding vectors of index 8 to 15 in the 2-layer codebook in Table 3 of the UL codebook in LTE-A in any fixed order. Precoding selection for $n_T=4$, $r=1$': the selected precoder should maximize $$g^{\dagger}\hat{R}g = \sum_{t=1}^{r} \lambda_i |g^{\dagger} p_t|^2,$$

where $p_t$ denotes the tth column of P.

For the specific case 206 for $r=3$: the selected precoder should maximize $$g^{\dagger}\hat{R}g = \lambda_i |g^{\dagger} p_1|^2 + \frac{\lambda_2}{4} + \frac{\lambda_3}{4}.$$

We then obtain the optimal precoder indices given in Table 8 of the UL codebook in LTE-A. Since the solution for each P is not unique, we select the one with the lowest index presented in Table 7 of the UL codebook in LTE-A.

For the precoding selection case 205 for $n_T=4$, $r=2$, $r'=1$: the selected precoder should maximize $g^{\dagger}\hat{R}g = \lambda_1|g^{\dagger}p_1|^2 + \lambda_2|g^{\dagger}p_2|^2$ or equivalently, $g^{\dagger}\hat{R}g = \lambda_1(|g^{\dagger}p_1|^2 + |g^{\dagger}p_2|^2) + (\lambda_2 - \lambda_1)|g^{\dagger}p_2|^2$ or $\lambda_2(|g^{\dagger}p_1|^2 + |g^{\dagger}p_2|^2) + (\lambda_1 - \lambda_2)|g^{\dagger}p_1|^2$.

Note that the optimal precoding selection only depends on the order of $\lambda_j$ or the order of MCS assignment in the original transmission. The results are provided in Table 9 of the UL codebook in LTE-A. We can see that for each rank-2 precoder in the original transmission, we have 4 or 2 choices for the retransmission that result in the same rate. For the $r=2$ precoders of index 8 to 15, the results of optimal retransmission precoding indices are same for two different orders of $\lambda_1$ and $\lambda_2$ meaning that the resulting precoding selection is solely based on the original precoder. Since the results are not unique, we use the one with the lowest index which is summarized in Table 7 of the UL codebook in LTE-A.

For the precoding selection case 207 for $n_T=4$, $r=3$, $r'=2$: The precoding vector for the retransmission with rank $r'=2$ can be chosen from Table 3 of the UL codebook in LTE-A, with the indices provided in Table 7 of the UL codebook in LTE-A based on the assigned MCSs, or a threshold for MCS1-MCS2, and precoding vectors in the original transmission.

In a simplified version, for $n_T=4$, if we only define one generalized precoder for each retransmission rank $r'$, based on the results shown in Table 6-8 of the UL codebook in LTE-A and the results for ($r=4$,$r'=2$), we can choose the precoder index selected in more cases than others. For example, the precoder with index 8 in a $r'$-layer codebook for retransmission rank $r'$.

Note that the precoding index is referring to the latest agreement on uplink precoding codebook defined in TR36.814 v9.0.0 in LTE-A standardizations.

Figure 4B:
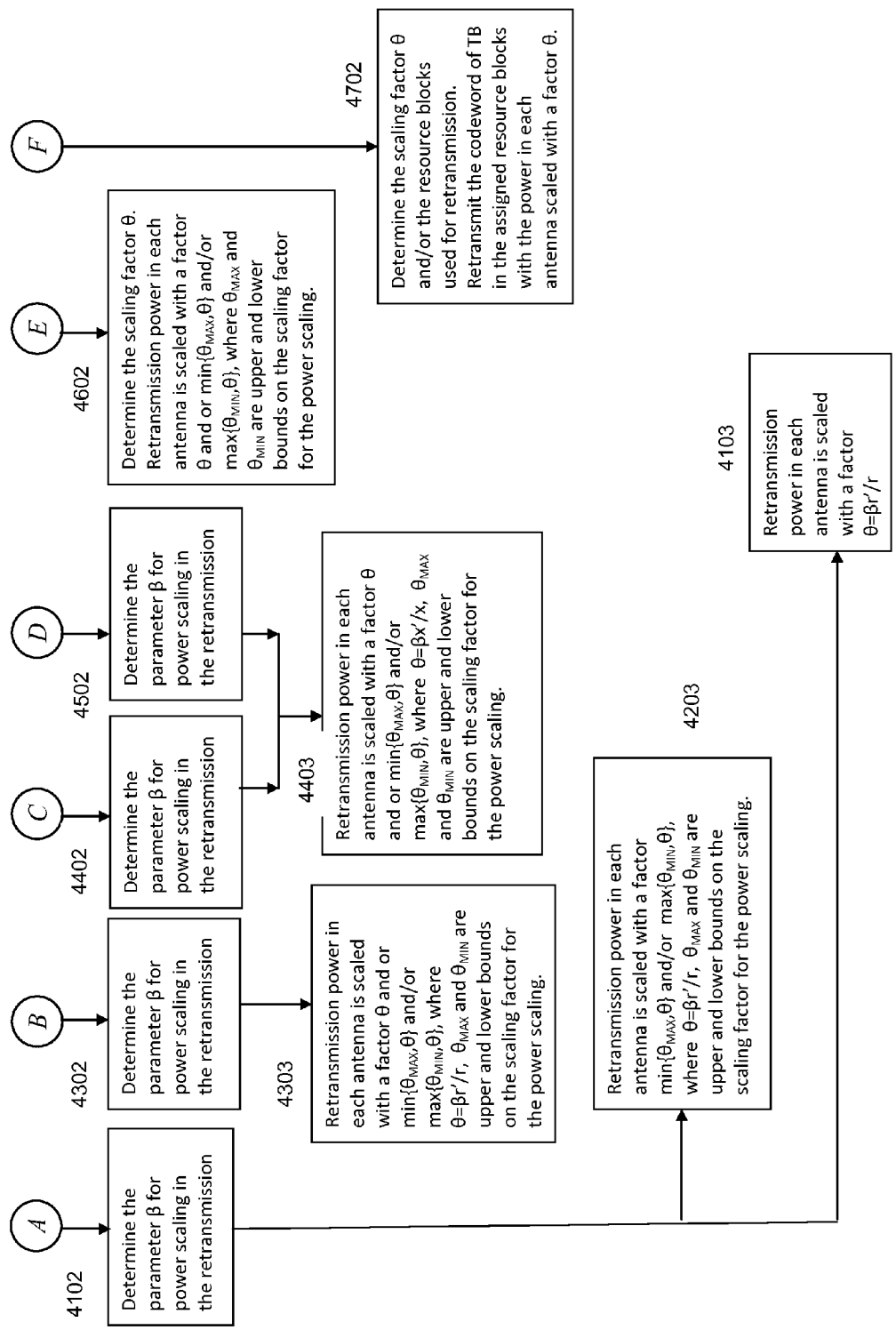

Turning now to FIG. 3, there is a shown a table of precoding matrices for PHICH triggered retransmission in UL MIMO, and FIG. 4 shows a block diagram detailing power scaling for HARQ retransmission for UL MIMO.

Applicants consider the case that the number of transmission blocks (TB) is less than that in the latest retransmission for a HARQ process. The precoder for retransmission is the precoding matrix with the lowest index from the agreed uplink codebook in 3GPP with the rank same as the transmission rank of the retransmission. The retransmission precoders of rank $r'$ are then given in the table shown in FIG. 3.

The invention provides a provide a power scaling method as a function of the original precoder and MCS assignment to avoid inefficient power scaling when the specified retransmission precoder does not align with the channel direction in non-adaptive hybrid ARQ. Denote $MCS_i$ as the MCS levels assigned in the previous transmission, r and r' are the rank of the precoder in the previous transmission and retransmission respectively. In each figure, the flow diagram describes the power scaling for the UL retransmission that is conducted at the user terminal. The retransmitted power in the power in the previous transmission scaled by a factor θ, or bounded by either an upper bound $θ_{max}$ or a lower bound $θ_{min}$ or both. Please note that the upper bound or lower bound can also be mapped to the upper or lower bound of β. The retransmission is trigger by the HARQ indicator channel. The precoder codebook in the previous transmission is defined in 3GPP TR 36.814 v9. Note that all the transmissions mentioned here are in one HARQ process.

The inventive power scaling for HARQ retransmission for UL MIMO 401 considers at least two of the following parameters of information 403:

Index of UL precoder in previous transmission,
Rank r of UL precoder in previous transmission,
MCS assignments in previous retransmission ($MCS_i$)
Rank r' for UL retransmission,
Number of retransmit antennas used for codeword to be retransmitted x in previous transmission,
Number of retransmit antennas x' used for retransmission,
Precoder for UL retransmission,
UL Precoders and Channel information for previous transmission, and
Latest channel measurements In response to the index and rank r of the UL precoder, MCS assignments in the previous retransmission ($MCS_i$), and the rank r' for UL retransmission 4101 the parameter β for power scaling in the retransmission is determined 4102 and one of: 1) retransmission power in each antenna is scaled with a factor θ=βr'/r 4102; or 2) retransmission power in each antenna is scaled with a factor $\min\{θ_{MAX},θ\}$ and/or $\max\{θ_{MIN},θ\}$, where θ=βr'/r, $θ_{MAX}$ and $θ_{MIN}$ are upper and lower bounds on the scaling factor for the power scaling 4203.

In response to the index and rank r of the UL precoder, MCS assignments in the previous retransmission ($MCS_i$), and the rank r' for UL retransmission 4301 the parameter β for power scaling in the retransmission is determined 4302 and retransmission power in each antenna is scaled with a factor θ and or $\min\{θ_{MAX},θ\}$ and/or $\max\{θ_{MIN},θ\}$, where θ=βr'/r, $θ_{MAX}$ and $θ_{MIN}$ are upper and lower bounds on the scaling factor for the power scaling 4303.

In response to either 1) the number of transmit antennas used for codeword to be retransmitted x, index of precoder and MCS assignments ($MCS_i$) in previous retransmission, number of transmit antennas x' to be used for retransmission 4401 or 2) the number of transmit antennas used for codeword to be retransmitted x, MCS assignments ($MCS_i$) in previous retransmission, number of transmit antennas x' to be used for retransmission 4501, the parameter β for power scaling in the retransmission is determined 4402, 4502 and retransmission power in each antenna is scaled with a factor θ and or $\min\{θ_{MAX},θ\}$ and/or $\max\{θ_{MIN},θ\}$, where θ=βx'/x, $θ_{MAX}$ and $θ_{MIN}$ are upper and lower bounds on the scaling factor for the power scaling 4403.

In response to Index of UL Precoder, MCS assignments in the previous retransmission ($MCS_i$), and precoder for UL retransmission 4601, the scaling factor θ is determined and retransmission power in each antenna is scaled with a factor θ and or $\min\{θ_{MAX},θ\}$ and/or $\max\{θ_{MIN},θ\}$, where $θ_{MAX}$ and $θ_{MIN}$ are upper and lower bounds on the scaling factor for the power scaling 4602.

In response to UL Precoders and channel information for all previous transmissions, latest channel measurement, and precoder for UL retransmission 4701, the scaling factor θ is and/or the resource blocks used for retransmission are determined and retransmit the codeword of TB in the assigned resource blocks with the power in each antenna scaled with a factor θ 4702.

From the foregoing it can be seen that the present inventive method of power scaling is more efficient on the power usage for the retransmission than hereto before. The inventive method of power scaling is a function of the original precoder and MCS assignment to avoid inefficient power scaling when the specified retransmission precoder does not align with the channel direction in non-adaptive hybrid ARQ. The invention simplifies the power scaling rule, which only depends on MCS assignments in the previous transmission. The inventive method provides technique for power scaling and resource allocation for UL retransmissions in the adaptive HARQ, in which the UL precoder and the resource block are determined by the base station and informed to the user terminal via a downlink control channel.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Further System Details

1. Power Scaling for UL MIMO in Non-Adaptive HARQ Wideband Uplink MIMO

We first recapitulate the precoding based on the approximations of channel covariance described in our previous proposal (ref [1]). We consider a uplink (UL) MIMO system with $n_T$ transmit antennas at UE and $n_R$ receive antennas at the base station (BS), or eNodeB. For wideband uplink MIMO in LTE-A, the DFT spread frequency division multiple access (DFT-S-FDMA) is employed as a multi-access technique for its low complexity on user separation while maintaining low peak-to-average power ratio (PAPR). The QAM modulated symbols are first processed by a DFT and then transmitted over a certain number of subcarriers with the OFDM interface. We assume that the precoding is operated after the codeword-to-layer mapping and DFT spreading. Denote the $n_R \times n_T$ complex matrix H as the UL channel, $G \in C^{n_T \times r}$ as the precoding matrix in the latest transmission of rank r, and $x \in C^{r \times 1}$ as transmitted symbol vector. The received signal can then be written as $$y[k]=H[k]Gx[k]+n[k], k=1,\ldots,N_{sub}, \quad (1)$$

where the index k denotes the kth subcarrier or subchannel and $N_{sub}$ denotes the number of subcarriers or subchannels occupied by the DFT spread codewords. Note that in (1) for simplicity we assume that the same precoder is used for all tones. Then, we can obtain the SINR for MMSE receiver at the ith layer and the kth subcarrier, denoted by $\gamma_{i,k}$, given by $$\gamma_{i,k} = \frac{g_i^\dagger H[k]^\dagger (I + H[k]GG^\dagger H[k]^\dagger)^{-1} H[k]g_i}{1 - g_i^\dagger H[k]^\dagger (I + H[k]GG^\dagger H[k]^\dagger)^{-1} H[k]g_i}, \quad (2)$$

where $(\bullet)^\dagger$ denotes the matrix conjugate transpose or Hermitian. The true effective SINR for DFT-S-FDMA can be computed as in ref [2]

$$SINR'_{i,\text{eff}} = \left( \frac{1}{\frac{1}{N_{sub}} \sum_{k=1}^{N_{sub}} \frac{\gamma_{i,k}}{1+\gamma_{i,k}}} - 1 \right)^{-1}. \quad (3)$$

With $SINR'_{i,\text{eff}}$, we can obtain the combined SINR for all layers mapped to the same codeword. The MCS can then be assigned by the eNodeB. To obtain the precoder for retransmissions with quantized channel information for such wideband case, we proceed as follows. It can be shown that for any choice of precoder G, the true effective SINR of the $i^{th}$ layer can be upper bounded as $$SINR'_{i,\text{eff}} \leq \frac{\Xi_{i,i}}{1 - \Xi_{i,i}} = SINR'_i(G) \quad (4)$$

where $$\Xi = (I + G^\dagger RG)^{-1} G^\dagger RG \quad (5)$$

$$R = \frac{1}{N_{sub}} \sum_{k=1}^{N_{sub}} H[k]^\dagger H[k].$$

We then approximate R by $R \triangleq P D P^\dagger$ with $D=\text{diag}\{\lambda_1/\eta_1,\ldots,\lambda_r/\eta_r\}$, where P is column-wise normalized precoding matrix employed in the first transmission, $\lambda_i$ denotes the SINR for the ith layer which can be obtained based on the MCSs assigned for the first transmission as described in ref. [1], and $\eta_i$ is the norm of the ith column of the precoding matrix employed in the first transmission. We can use the SINR upper bound in (4) to approximate the SINR for the retransmission. Denote r' as the rank for retransmission where r'<r. Particularly for retransmission rank r'=1 given the precoding vector g used in the retransmission, we have $$SINR'(g)=g^\dagger Rg. \quad (6)$$

If there is no power scaling, the power employed in each antenna remains the same as that in the first transmission. Therefore, to consider the power scaling, we assume a unit per antenna power. For a given retransmission precoder, we can obtain the general power scaling rule as follows. Denote $T_t$ as the set of layers mapped to the tth transmission block or codeword. We then have the original rate for the $TB_t$ given by $$R_t = \Sigma_{i \in T_t} \log_2(1+\lambda_i). \quad (7)$$

Then the power scaling factor θ is applied to satisfy $$R' = \Sigma_i \log_2(1+\theta SINR'_i(G')) = \kappa R_t, \quad (8)$$

where R' is the effective information rate assumed in the retransmission and $\kappa R_t$ is the targeted rate for the retransmission. By setting κ=1, we want the retransmission power after scaling to achieve the same rate as that in the original transmission. Then for rank-1 retransmission, the rate constraint for power scaling can be directly translated to the power constraint. We then have $$\theta g^\dagger Rg = \kappa' \lambda_t, \quad (9)$$

where κ' is a scaling factor for the targeted retransmission SINR $\kappa' \lambda_t$, i.e., the total scaling factor for retransmission is $$\frac{\theta}{k'}$$

We usually consider $\kappa'=1$. Please note that although the power scaling constraint in (9) is for rank-1 retransmissions, we can similarly have an explicit power scaling for rank-2 retransmission instead of the rate constraint as in (8).

Since the number of layers used in the retransmission is less than the original retransmission, an intuitive choice for the power scaling factor would be the ratio of retransmission rank over the original rank, i.e., $$\theta = \frac{r'}{r}.$$

However, due to the variations of the precoder and MCS assignment in the original transmission, based on the analysis in the next, we would like to suggest the scaling factor in a form of $$\theta = \frac{r'}{r}\beta,$$

where $\beta$ can be determined from the original precoder and MCS assignment. We can use $$\frac{r'}{r}$$

as the lower bound for the power scaling factor. Therefore, $\max\{\beta, 1\}$ is applied instead of $\beta$. Since during the retransmission more antennas are employed for the retransmitted codeword or TB, power scaling up is typically not an efficient solution. Therefore the power scaling factor should be $$\min\{1, \theta\} \text{ or } \min\left\{1, \frac{r'}{r}\max\{\beta, 1\}\right\}.$$

We now investigate the power scaling as a function of rank of both initial and retransmission.

Power Scaling for Retransmissions in LTE-A

Based on the agreement in the 3GPP RAN1 62bis meeting, when the retransmission rank is lower than the latest transmission, the precoder for retransmission is the precoding matrix with the lowest index from the agreed uplink codebook with the rank same as the transmission rank of the retransmission r'. We list all retransmission precoders in Table 1.

TABLE 1

Precoding matrices for PHICH triggered retransmission
(non-adaptive HARQ) in UL MIMO

| $n_T = 2$, $r' = 1$ | $n_T = 4$, $r' = 1$ | $n_T = 4$, $r' = 2$ |
|---|---|---|
| $\begin{bmatrix} 1 \\ 1 \end{bmatrix}$ | $\begin{bmatrix} 1 \\ 1 \\ 1 \\ -1 \end{bmatrix}$ | $\begin{bmatrix} 1 & 0 \\ 1 & 0 \\ 0 & 1 \\ 0 & -j \end{bmatrix}$ |

Again we assume unit power for each entry in the precoding matrix. Based on the precoders given in Table 1 and agreed UL precoders given in Table 1-4, we now investigate the power scaling for retransmissions.

Power Scaling for $n_T=2$:

For $n_T=2$ we only have one retransmission scenario, i.e., (r=2, r'=1). The precoder employed in the original transmission is an identity matrix. Here we assume unit power per antenna. For the codeword or TB to be retransmitted, the SINR in the original transmission is $\lambda_1$ or $\lambda_2$ depending on which layer is used. Then with the precoder g' for the retransmission given in Table 1, we have $$SINR'(g')=\lambda_1|g'_1|^2+\lambda_2|g'_2|^2. \qquad (10)$$

Applying the precoder given in Table 1, we have $$SINR'(g')=\lambda_1+\lambda_2. \qquad (11)$$

Therefore the power scaling factor for the retransmission of the ith codeword or TB to reach the scaled rate of the original transmission is given by $$\theta_i = \kappa'\frac{\lambda_i}{\lambda_1+\lambda_2}. \qquad (12)$$

With $\zeta'=1$ and $$\theta = \frac{r'}{r}\beta = \frac{\beta}{2},$$

we obtain $$\beta_i = \frac{2\lambda_i}{\lambda_1+\lambda_2} = \frac{2}{1+\lambda_{\bar{i}}/\lambda_i}, \qquad (13)$$

where $\bar{i}$ denotes the index of the other codeword or TB that is not retransmitted. Since we have set the limit for power scaling factor, we can approximate above expression with $$\beta_i \approx \frac{2}{1+MCS_{\bar{i}}/MCS_i} \approx \frac{MCS_i}{MCS_{\bar{i}}}, \qquad (14)$$

where $MCS_i$ denotes the MCS index.

Power Scaling for $n_T=4$:

We first consider r=4. The retransmission rank r'=2. Since the UL precoding matrices defined in ref [3] have only one nonzero entry in each row. We can represent the UL precoder by $$G = \begin{bmatrix} e_{i_1}^T \\ \vdots \\ e_{i_{n_T}}^T \end{bmatrix}, \qquad (15)$$

where $e_j$ is a length-r vector with only one nonzero element, $e_j$, at the jth entry, and $e_j \in \{1, -1, j, -j\}$. Therefore, we have $$G'^{\dagger}RG' = G'^{\dagger}DG' = [e_{i_1}'^*, \ldots, e_{i_{n_T}}'^*]D\begin{bmatrix} e_{i_1}'^T \\ \vdots \\ e_{i_1}'^T \end{bmatrix} = \qquad (16)$$

$$\text{diag}\left\{\sum_{j:i_j=1}\lambda_j, \ldots, \sum_{j:i_j=r'}\lambda_j\right\}.$$

where $(\cdot)^*$ and $(\cdot)^T$ denote conjugate and transpose, respectively. The original rate is $$R_i=\log_2(1+\lambda_1)+\log_2(1+\lambda_2) \text{ or } \log_2(1+\lambda_3)+\log_2(1+\lambda_4). \qquad (17)$$

With the precoder for r'=2 given in Table 1, the retransmission rate is $$R'=\log_2(1+\lambda_1+\lambda_2)+\log_2(1+\lambda_3+\lambda_4). \qquad (18)$$

Since we obtain $\lambda_j$ from MCS assignments in the original retransmission, we then have $\lambda_1=\lambda_2$ and $\lambda_3=\lambda_4$. Therefore, the power scaling factor can be obtained by $$\log_2(1+2\theta\lambda_1)+\log_2(1+2\theta\lambda_3)=2\kappa\log_2(1+\lambda_1) \text{ or } 2\kappa\log_2(1+\lambda_3). \quad (19)$$

With $\kappa=1$ and $$\theta = \frac{r'}{r}\beta = \frac{1}{2}\beta,$$

we have $$\log_2(1+\beta_i\lambda_i)+\log_2(1+\beta_i\lambda_{\bar{i}})=2\log_2(1+\lambda_i). \quad (20)$$

If $\lambda_{\bar{i}} \geq \lambda_i$, we can simply set $\beta=1$, i.e., the scaling factor $$\theta = \frac{r'}{r} = \frac{1}{2}.$$

Otherwise, we consider that after the scaling the average of SINRs of two layers in the retransmissions is equal to the SINR value in the original codeword, i.e., $$\frac{1}{2}(\beta_i\lambda_i + \beta_i\lambda_{\bar{i}}) = \lambda_i \Rightarrow \beta_i = \frac{2\lambda_i}{\lambda_i + \lambda_{\bar{i}}}. \quad (21)$$

So we can use the same simple rule as aforementioned for $n_T=2$, i.e., $$\beta_i \approx \frac{MCS_i}{MCS_{\bar{i}}}. \quad (22)$$

For any other r with the retransmission rank r'=1, with UL precoders defined in (15), we have $$g^\dagger R g = g^\dagger \begin{bmatrix} e_{i_1}^T \\ \vdots \\ e_{i_{n_T}}^T \end{bmatrix} D[e_{i_1}^*, \ldots, e_{i_{n_T}}^*]g = \sum_{t=1}^{r} \frac{\lambda_t}{\eta_t}|g^\dagger p_t|^2. \quad (23)$$

When r=2, we have $$g^\dagger R g = \frac{\lambda_1}{\eta_1}|g^\dagger p_1|^2 + \frac{\lambda_2}{\eta_2}|g^\dagger p_2|^2. \quad (24)$$

For original transmission, the SINR is $\lambda_1$ or $\lambda_2$. For the agreed retransmission precoder specified in Table 1, i.e., rank-1 precoder of index 0, we have $g^\dagger R g = a_1\lambda_1 + a_2\lambda_2$, where $a_i = |g^\dagger p_i|^2/\eta_i$ with $\eta_i=2$ for all rank-2 precoders and $(a_1, a_2)$ given in Table 2, for the precoder of index 0 to 15 in the first transmission.

With power scaling down to the desired SINR $\kappa' \lambda_i$ in the original transmission, we have the scaling factor $\theta_i$ for retransmission of TB i, given by $$\theta_i = \frac{\kappa'\lambda_i}{a_1\lambda_1 + a_2\lambda_2}. \quad (25)$$

We can see from Table 2 for either $a_i$, six of them are equal to one, e.g., (0, 1, 8, 9, 14, 15) for $a_1$ and (3, 7, 9, 11, 12, 14) for $a_2$, indicating that for retransmitting codeword i with agreed retransmission precoder, the retransmission SINR is no less than that in the initial transmission. Therefore, we can have a certain power down scaling but not smaller than that in the original transmission (considering $\kappa'=1$). For the other cases, depends on the SINR values or MCS assignment in the original transmissions. For the original precoders of index 10 and 13, the resulting approximate SINRs are zero, meaning that the retransmission precoder is orthogonal to the original precoder which is so called null trap. For these two null traps, it would be better not to have a power down scaling.

With $\kappa'=1$ and $$\theta_i = \frac{r'}{r}\beta_i,$$

we then have $$\beta_i = \frac{2\lambda_i}{a_1\lambda_1 + a_2\lambda_2} = \frac{2}{a_i + a_{\bar{i}}\frac{\lambda_{\bar{i}}}{\lambda_i}}. \quad (26)$$

Similarly with the MCS approximation, we have $$\beta_i \approx \frac{2}{a_i + a_{\bar{i}}\frac{MCS_{\bar{i}}}{MCS_i}}, \quad (27)$$

or $$\beta_i \approx \frac{2}{(a_i + a_{\bar{i}})\frac{\lambda_{\bar{i}}}{\lambda_i}} = \frac{2}{(a_i + a_{\bar{i}})}\frac{\lambda_i}{\lambda_{\bar{i}}} \approx \frac{2}{(a_i + a_{\bar{i}})}\frac{MCS_i}{MCS_{\bar{i}}}. \quad (28)$$

We can further simplify the power scaling rule independent of original precoder, i.e., $$\beta_i \approx \bar{a}\frac{MCS_i}{MCS_{\bar{i}}},$$

where $\bar{a}$ can be the average of $$\frac{2}{(a_i + a_{\bar{i}})}$$

over channel realizations.

TABLE 2

| Parameters $a_i$ for the initial rank-2 precoder of index 0 to 15. | | | | | | | | | | | | | | | | |
|---|---|---|---|---|---|---|---|---|---|---|---|---|---|---|---|---|
| index for r = 2 | 0 | 1 | 2 | 3 | 4 | 5 | 6 | 7 | 8 | 9 | 10 | 11 | 12 | 13 | 14 | 15 |
| $a_1$ | 1 | 1 | ½ | ½ | 0 | 0 | ½ | ½ | 1 | 1 | 0 | 0 | 0 | 0 | 1 | 1 |
| $a_2$ | ½ | ½ | 0 | 1 | ½ | ½ | 0 | 1 | 0 | 1 | 0 | 1 | 1 | 0 | 1 | 0 |

When r=3 and r'=1, we have $$g^\dagger R g = \frac{\lambda_1}{\eta_1}|g^\dagger p_1|^2 + \lambda_2 + \lambda_3, \quad (29)$$

The SINR from original transmission is $\lambda_1$. The power scaling constraint is then $$\theta\left(\frac{\lambda_1}{\eta_1}|g^\dagger p_1|^2 + \lambda_2 + \lambda_3\right) = \kappa'\lambda_1. \quad (30)$$

With the agreed rank-1 precoding given in Table 1, we have $g^\dagger R\, g = b_1\lambda_1 + \lambda_2 + \lambda_3$ where $b_1 \triangleq |g^\dagger p_1|^2/\eta_1$ and $\eta_1=2$ for all rank-3 precoders. We then obtain $b_1=(1,0,1,0,0,1,1,0,0,1,0,1)$ for the original rank-3 precoder of index in order from 0 to 11. We can see that half of them have $b_1=1$, meaning that a power down scaling can be applied to these cases without reducing the retransmission rate. Therefore, we have $$\theta = \frac{\lambda_1}{\lambda_1 + \lambda_2 + \lambda_3} \text{ or } \frac{\lambda_1}{\lambda_2 + \lambda_3}. \quad (31)$$

If $\lambda_2 = \lambda_3 \geq 2\lambda_1$, and set $\kappa'=1$, we can have the power scaling factor $$\theta \geq \frac{1}{3}$$

for those six cases of $b_1=1$ and $$\theta \geq \frac{1}{2}$$

for the other cases. Since $\lambda_2=\lambda_3$ due to same MCS assignment for one codeword, with $$\theta = \frac{r'}{r}\beta = \frac{\beta}{3},$$

we have $$\beta = \frac{3}{b+2\lambda_2/\lambda_1} \approx \frac{3}{b+2\frac{MCS_2}{MCS_1}} \approx \frac{3}{b+2}\frac{MCS_1}{MCS_2}. \quad (32)$$

Similarly, we can further simplify the power scaling for this case as $$\beta = \approx \bar{b}\frac{MCS_1}{MCS_2}$$

where $\bar{b}$ can be the average of $$\frac{3}{b+2}.$$

When r=3 and r'=2, the sum-rate in the original transmission is $$W(G')=\log_2(1+\lambda_2)+\log_2(1+\lambda_3). \quad (33)$$

With the retransmission precoding, we have $$G^\dagger R G = \begin{bmatrix} \sum_{t=1}^{r}\frac{\lambda_t}{\eta_t}|g_1^\dagger p_t|^2 & \sum_{t=1}^{r}\frac{\lambda_t}{\eta_t}(g_1^\dagger p_t)(p_t^\dagger g_2) \\ \sum_{t=1}^{r}\frac{\lambda_t}{\eta_t}(g_2^\dagger p_t)(p_t^\dagger g_1) & \sum_{t=1}^{r}\frac{\lambda_t}{\eta_t}|g_2^\dagger p_t|^2 \end{bmatrix}, \quad (34)$$

where $\eta_1=2$ and $\eta_2=\eta_3=1$. To simplify the analysis, we assume the cross entries are zero. (If the cross entries are not zero, the resulting SINRs for the two layers in the retransmissions would be lower than the estimate, consequently, the SINRs after power down scaling. This is fine for the retransmission as we have a lower bound on power down scaling.) Then the SINRs for two layers in the retransmissions are $$\sum_{t=1}^{r}\frac{\lambda_t}{\eta_t}|g_1^\dagger p_t|^2$$

and $$\sum_{t=1}^{r}\frac{\lambda_t}{\eta_t}|g_2^\dagger p_t|^2.$$

Assuming $\lambda_2=\lambda_3$ and defining $$c_1 = \frac{1}{\eta_1}|g_1^\dagger p_1|^2 \; c_2 = \frac{1}{\eta_2}|g_1^\dagger p_2|^2 + \frac{1}{\eta_3}|g_1^\dagger p_3|^2, \quad (35)$$

$$c_3 = \frac{1}{\eta_1}|g_2^\dagger p_1|^2 \; c_4 = \frac{1}{\eta_2}|g_2^\dagger p_2|^2 + \frac{1}{\eta_3}|g_2^\dagger p_3|^2, \quad (36)$$

We then have $$\text{SNR}'_1 = c_1\lambda_1 + c_2\lambda_2, \text{ and SNR}'_2 = c_3\lambda_1 + c_4\lambda_2, \quad (37)$$

where $c_1, \ldots, c_4$ are given in Table 3 for different rank-3 precoders when the retransmission rank-2 precoder in Table 1 is applied. Therefore the power scaling factor $\theta$ is set by $$\log_2(1+\theta c_1\lambda_1+\theta c_2\lambda_2)+\log_2(1+\theta c_3\lambda_1+\theta c_4\lambda_2)=2\kappa\log_2(1+\lambda_2). \quad (38)$$

With $\kappa=1$, to simplify the power scaling rule, we set the power scaling factor so that $\theta(c_1\lambda_1+c_2\lambda_2)=\lambda_2$ or $\theta(c_3\lambda_1+c_4\lambda_2)=\lambda_2$, or the average SINR after scaling in the retransmission is equal to the SINR for the same TB in the original transmission, i.e., or the average of these two, i.e., $$\frac{1}{2}\theta(c_1\lambda_1+c_2\lambda_2+c_3\lambda_1+c_4\lambda_2)=\lambda_2 \Rightarrow \theta = \frac{\lambda_2}{(c_1+c_3)\lambda_1+(c_2+c_4)\lambda_2}. \quad (39)$$

With $$\theta = \frac{r'}{r}\beta = \frac{2}{3}\beta$$

and similar approximation procedures, we have $$\beta = \frac{3}{2} \frac{1}{(c_1+c_3)\lambda_1/\lambda_2 + (c_2+c_4)} \approx \qquad (40)$$
$$\frac{3}{2} \frac{1}{(c_1+c_3)MCS_1/MCS_2 + (c_2+c_4)} \approx \frac{3}{2} \frac{1}{c_1+c_2+c_3+c_4} \frac{MCS_2}{MCS_1}.$$

Again, we can further simplify the power scaling rule by using $$\beta \approx \bar{c} \frac{MCS_2}{MCS_1}.$$

TABLE 3

Power scaling parameters $c_i$ for the initial rank-3 precoder of index 0 to 11.

| Index for r = 3 | 0 | 1 | 2 | 3 | 4 | 5 | 6 | 7 | 8 | 9 | 10 | 11 |
|---|---|---|---|---|---|---|---|---|---|---|---|---|
| $c_1, c_2$ | 1, 0 | 0, 0 | ¼, 1 | ¼, 1 | ¼, 1 | ¼, 1 | ¼, 1 | ¼, 1 | ¼, 1 | ¼, 1 | 0, 2 | 0, 2 |
| $c_3, c_4$ | 0, 2 | 0, 2 | ¼, 1 | ¼, 1 | ¼, 1 | ¼, 1 | ¼, 1 | ¼, 1 | ¼, 1 | ¼, 1 | ½, 0 | ½, 0 |

Remarks: When the number of TBs in the retransmission is less than that in the original or the latest transmission, for most cases the rank ratio ir'/r=2. Moreover we can see from the specified retransmission precoder, the number of antennas used in the retransmission is always double of that used for transmitting the codeword or TB in the original transmission. So we can also define the power scaling with r'/r replaced by a simple factor ½. The power scaling rules can then be summarized as follows.

The transmit power of retransmission is scaled by a scaling factor from the original power. The power scaling factor for retransmission can be specified as $$\min\left\{1, \frac{1}{2}\max\{\beta, 1\}\right\}$$

where $\beta$ is given as follows for different scenarios.

For ($n_T$=2, r=2, r'=1) and ($n_T$=4, r=4, r'=2), we have $$\beta = \frac{MCS_i}{MCS_{\bar{i}}} \qquad (41)$$

where $MCS_i$ denotes the MCS level assigned to the codeword or TB to be retransmitted and $MCS_{\bar{i}}$ denotes the MCS level assigned to the other one that is already successfully decoded.

For ($n_T$=4, r=2, r'=1), we have $$\beta_i = \frac{2}{(a_i + a_{\bar{i}})} \frac{MCS_i}{MCS_{\bar{i}}}, \qquad (42)$$

where the values of $a_1$ and $a_2$ are given in Table 2.

For ($n_T$=4, r=3, r'=1), we have $$\beta = \frac{2}{b_1+2} \frac{MCS_2}{MCS_1}. \qquad (43)$$

where $b_1$={1,0,1,0,0,1,1,0,0,1,0,1} for the original rank-3 precoder in the order of index 0 to 11.

For ($n_T$=4, r=3, r'=2), we have $$\beta = \frac{2}{c_1+c_2+c_3+c_4} \frac{MCS_2}{MCS_1}... \qquad (44)$$

where $c_1$, $c_2$, $c_3$, and $c_4$ are given in Table 3 for the original rank-3 precoder of index from 0 to 11.

Also to remove the dependency to the particular precoder in the original transmission, we can simplify the power scaling factor $\beta$ by $$\frac{MCS_i}{MCS_{\bar{i}}}, \frac{MCS_i}{MCS_{\bar{i}}}, \bar{a}\frac{MCS_i}{MCS_{\bar{i}}}, \bar{b}\frac{MCS_i}{MCS_{\bar{i}}}, \text{ and } \bar{c}\frac{MCS_i}{MCS_{\bar{i}}}$$

for above five scenarios, respectively.

A final approximation would be letting $$\frac{MCS_i}{MCS_{\bar{i}}} \approx 1.$$

Then the power scaling is reduced to a single parameter for different cases. For example, we suggest the scaling $$\text{factor } \theta \in \left\{\frac{1}{2}, \frac{1}{2}\bar{a}, \frac{1}{2}\bar{b}, \frac{1}{2}\bar{c}\right\}.$$

2. Power Scaling for UL MIMO Retransmissions in Adaptive HARQ

We now consider power scaling for precoded UL retransmission in adaptive HARQ when the number of codewords or transmission blocks is less than that in the original or latest transmission. In adaptive HARQ of UL MIMO with DFT-S-FDMA, the resource block and the precoder for the retransmission are informed to the user terminal via control channel. Therefore, the precoder for the retransmission is not fixed. Then the power scaling can be flexible based on the assigned precoder, as well as the original precoder. Denote G and G' as the precoder in the previous transmission and retransmission, respectively. We consider the upper bound SINR for both original transmission and retransmission as in (4), i.e, $SINR'_i(G, \tilde{R})$ and $SINR'_i(G', \tilde{R}')$, given by $$SINR'_i(G, \tilde{R}) = \frac{\Xi_{i,i}(G, \tilde{R})}{1 - \Xi_{i,i}(G, \tilde{R})} \quad (45)$$

where $$\Xi(G, \tilde{R}) = (I + G^\dagger RG)^{-1} G^\dagger RG \quad (46)$$

$$R = \frac{1}{N_{sub}} \sum_{k=1}^{N_{sub}} H[k]^\dagger H[k].$$

Note that $\tilde{R}$ can be based on the measurement of channel $H[k]$ during the time slot of the previous transmissions, and $\tilde{R}'$ is obtained based on the latest channel measurement. Given the channel rate for the tth codeword to be retransmitted in the original transmission $$R = \Sigma_{i \in T_t} \log_2(1 + SINR_i(G, \tilde{R})), \quad (47)$$

the power scaling for precoded retransmission with the target retransmission rate $\kappa R$ is given by $$R' = \sum_{i=1}^{r'} \log_2(1 + \theta SINR'_i(G', \tilde{R})) = \frac{N}{N'} \kappa R. \quad (48)$$

where N and N' denote the number of resource blocks or subcarriers scheduled in original transmission and to be scheduled in the retransmission, respectively.

We can also obtain the power scaling based on the average SINR over layers, i.e.

$$\Sigma_i \theta SINR'_i(G', \tilde{R}')) = \kappa \Sigma_{i \in T_t} SINR_i(G, \tilde{R}). \quad (49)$$

We may define the power scaling as well as the resource allocation for the Q th retransmission in general. We assume that from the zth retransmission, the number of codewords is less than the previous transmission. The number of layers is then r'. Denote $G_q$ and $\tilde{R}_q$ as the precoder and the channel covariance matrix in the qth retransmission. We then obtain the following rate for the previous Q−1 transmissions $$R_{Q-1} = \Sigma_{q=1}^{z-1} N_q \Sigma_{i \in T_{t'}} \log_2(1 + SINR_i(G_q, \tilde{R}_q)) + \Sigma_{q=z}^{Q-1} N_q \Sigma_{i=1}^{r'} \log_2(1 + SINR_i(G_q, \tilde{R}_q)). \quad (50)$$

We can then determine the resource allocation and power scaling for the q th retransmission based on $$R_{Q-1} + N_Q \Sigma_{i=1}^{r'} \log_2(1 + \theta SINR_i(G_Q, \tilde{R}_Q)) = \overline{R}, \quad (51)$$

where $\overline{R}$ is the target combined rate for the UL scheduler.

REFERENCES

[1] NEC, "Precoding selection for PHICH triggered retransmission in UL MIMO," in 3*GPP TSG RAN WG*1 R1-105418, Xi'an, China, October 2010.
[2] G. Berardinelli, T. B. Sorensen, P. E. Mogensen, and K. Pajukoski, "Precoded multirank transmission with linear receivers for LTE-A uplink," in *Proc. IEEE Veh. Technol. Conf (VTC)*, Anchorage, AK, September 2009.
[3] 3GPP, *Evolved Universal Terrestrial Radio Access (E-UTRA); Further advancements for (E-UTRA) physical layer aspects*. TR36.814 V9.0.0, March 2010.

The invention claimed is:
1. A method comprising:
obtaining a precoder used to retransmit one codeword responsive to a known precoding matrix P of rank r and modulation and coding scheme MCS assignments used in an original transmission, and a desired retransmission rank r'; and
scaling power in said retransmission responsive to at least three of 1) index of an uplink (UL) precoder used in a previous transmission, 2) rank r of an uplink (UL) precoder used in a previous transmission, 3) MCS assignments in a previous retransmission, 4) the desired transmission rank r' used in a UL retransmission 5) the number of retransmit antennas x used for the codeword to be retransmitted in a previous transmission, 6) the number of retransmit antennas x' used for the retransmission, 7) precoder used for a UL retransmission, 8) UL precoders and channel information for previous transmissions, and 9) latest channel measurements,
wherein the method includes one of:
a) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor θ=βr'/r,
b) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor $\min\{\theta_{MAX}, \theta\}$ and/or $\max\{\theta_{MIN}, \theta\}$, where θ=βr'/r and $\theta_{MAX}$ and $\theta_{MIN}$ are upper and lower bounds, respectively, on the scaling factor for the scaling power,
c) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor θ and/or $\min\{\theta_{MAX}, \theta\}$ and/or $\max\{\theta_{MIN}, \theta\}$, where θ=βr'/r and $\theta_{MAX}$ and $\theta_{MIN}$ are upper and lower bounds, respectively, on the scaling factor for the scaling power,
d) responsive to the number of retransmit antennas x used for the codeword to be retransmitted, index of precoder and MCS assignments in the previous retransmission, the number of transmit antennas x' to be used for retransmission, determining a parameter β used to perform the scaling power in the retransmission and scaling a retransmission power in each antenna of the x' antennas used for the retransmission with a factor θ and/or $\min\{\theta_{MAX}, \theta\}$ and/or $\max\{\theta_{MIN}, \theta\}$, where θ=βx'/x and $\theta_{MAX}$ and $\theta_{MIN}$ are upper and lower bounds, respectively, on the scaling factor for the scaling power,
e) responsive to the number of retransmit antennas x used for the codeword to be retransmitted, MCS assignments in the previous retransmission, the number of transmit antennas x' to be used for retransmission, determining a parameter β used to perform the scaling power in the retransmission and scaling a retransmission power in each antenna of the x' antennas used for the retransmission with a factor θ and/or $\min\{\theta_{MAX}, \theta\}$ and/or $\max\{\theta_{MIN}, \theta\}$, where θ=βx'/x and $\theta_{MAX}$ and $\theta_{MIN}$ are upper and lower bounds, respectively, on the scaling factor for the scaling power,
f) responsive to index of UL precoder, MCS assignments in the previous retransmission, and precoder for UL retransmission, determining a scaling factor θ and scal- ing a retransmission power in each antenna of the x' antennas used for the retransmission with a factor θ and/or min{$\theta_{MAX}$, θ} and/or max{$\theta_{MIN}$, θ}, where $\theta_{MAX}$ and $\theta_{MIN}$ are upper and lower bounds, respectively, on the scaling factor for the scaling power, and g) responsive to the UL precoders and channel information for all previous transmissions, latest channel measurement, and precoder for UL retransmission, determining a scaling factor θ and resource blocks used for retransmission and scaling a retransmission of the codeword of transport blocks (TBs) in assigned resource blocks with the power in each antenna of the x' antennas used for the retransmission with the factor θ.

2. The method of claim 1, wherein, in step a), the parameter β or the factor θ is determined based on the signal-to-interference-plus-noise-ratio SINR and/or the MCS of each layer in a previous transmission and the SINRs and/or the MCSs for layers that are to be retransmitted which is obtained based on the precoder and MCS in the previous transmission and the precoder and MCS that are either preconfigured or determined by a base station to be used in a current retransmission.

3. The method of claim 1, wherein, in step g), the factor θ is determined independently or jointly with the precoder for the retransmission based on the SINRs or the MCSs of each layer in previous transmissions and the SINRs and/or the MCSs for layers that are to be retransmitted which is obtained based on the precoder and MCS in the previous transmission and the precoder and MCS that are to be used in a current retransmission.

4. A method comprising:
obtaining a precoder used to retransmit one codeword responsive to known precoding matrix P of rank r and modulation and coding scheme MCS assignments used in an original transmission, and a desired retransmission rank r';
forming an approximate channel covariance matrix;
estimating a minimum mean square error receiver signal-to-interference-plus-noise-ratio (SINR) for each layer to be retransmitted responsive to said forming step;
finding a precoding matrix from a precoding codebook that maximizes a sum-rate for enabling precoding selections for retransmissions in uplink multiple-input multiple-output MIMO hybrid automatic repeat request HARQ; and
scaling power in said retransmission responsive to at least three of 1) index of an uplink (UL) precoder used in a previous transmission, 2) rank r of an uplink (UL) precoder used in a previous transmission, 3) MCS assignments in a previous retransmission, 4) the desired transmission rank r' used in a UL retransmission 5) the number of retransmit antennas x used for the codeword to be retransmitted in a previous transmission, 6) the number of retransmit antennas x' used for the retransmission, 7) precoder used for a UL retransmission, 8) UL precoders and channel information for previous transmissions, and 9) latest channel measurements,
wherein the method includes one of:

a) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor θ=βr'/r, b) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor min{$\theta_{MAX}$, θ} and/or max{$\theta_{MIN}$, θ}, where θ=βr'/r and $\theta_{MAX}$ and $\theta_{MIN}$ are upper and lower bounds, respectively, on the scaling factor for the scaling power, c) responsive to the index and rank r of the UL precoder, MCS assignments in the previous retransmission, and the rank r' for UL retransmission, determining a parameter β used to perform the scaling power in the retransmission and scaling a retransmission power in each antenna of the x' antennas used for the retransmission with a factor θ and/or min{$\theta_{MAX}$, θ} and/or max{$\theta_{MIN}$, θ}, where θ=βr'/r and $\theta_{MAX}$ and $\theta_{MIN}$ are upper and lower bounds, respectively, on the scaling factor for the scaling power, d) responsive to the number of retransmit antennas x used for the codeword to be retransmitted, index of precoder and MCS assignments in the previous retransmission, the number of transmit antennas x' to be used for retransmission, determining a parameter β used to perform the scaling power in the retransmission and scaling a retransmission power in each antenna of the x' antennas used for the retransmission with a factor θ and/or min{$\theta_{MAX}$, θ} and/or max{$\theta_{MIN}$, θ}, where θ=βx'/x and $\theta_{MAX}$ and $\theta_{MIN}$ are upper and lower bounds, respectively, on the scaling factor for the scaling power, e) responsive to the number of retransmit antennas x used for the codeword to be retransmitted, MCS assignments in the previous retransmission, the number of transmit antennas x' to be used for retransmission, determining a parameter β used to perform the scaling power in the retransmission and scaling a retransmission power in each antenna of the x' antennas used for the retransmission with a factor θ and/or min{$\theta_{MAX}$, θ} and/or max{$\theta_{MIN}$, θ}, where θ=βx'/x and $\theta_{MAX}$ and $\theta_{MIN}$ are upper and lower bounds, respectively, on the scaling factor for the scaling power, f) responsive to index of UL precoder, MCS assignments in the previous retransmission, and precoder for UL retransmission, determining a scaling factor θ and scaling a retransmission power in each antenna of the x' antennas used for the retransmission with a factor θ and/or min{$\theta_{MAX}$, θ} and/or max{$\theta_{MIN}$, θ}, where $\theta_{MAX}$ and $\theta_{MIN}$ are upper and lower bounds, respectively, on the scaling factor for the scaling power, and g) responsive to the UL precoders and channel information for all previous transmissions, latest channel measurement, and precoder for UL retransmission, determining a scaling factor θ and resource blocks used for retransmission and scaling a retransmission of the codeword of transport blocks (TBs) in assigned resource blocks with the power in each antenna of the x' antennas used for the retransmission with the factor θ.

* * * * *